(No Model.) 2 Sheets—Sheet 1.

B. C. DORSEY.
DISK CULTIVATOR AND SEEDER.

No. 384,748. Patented June 19, 1888.

Witnesses,
Geo. H. Strong.
J. H. Rouse.

Inventor.
B. C. Dorsey.
By Dewey & Co.
atty (No Model.) 2 Sheets—Sheet 2.

B. C. DORSEY.
DISK CULTIVATOR AND SEEDER.

No. 384,748. Patented June 19, 1888.

Witnesses,
Geo. H. Strong

Inventor,
B. C. Dorsey.
By Dewey & Co.
attys.

UNITED STATES PATENT OFFICE.

BASIL CLINTON DORSEY, OF TULARE, ASSIGNOR OF ONE-HALF TO WILLIAM L. MORROW, OF SAN LUIS OBISPO, CALIFORNIA.

DISK CULTIVATOR AND SEEDER.

SPECIFICATION forming part of Letters Patent No. 384,748, dated June 19, 1888.

Application filed January 24, 1888. Serial No. 261,781. (No model.)

*To all whom it may concern:*

Be it known that I, BASIL CLINTON DORSEY, of Tulare, in the county of Tulare and State of California, have invented an Improvement in Disk Cultivators and Seeders; and I hereby declare the following to be a full, clear, and exact description thereof.

My invention relates to that class of disk cultivators and seeders represented by Patent No. 344,950, issued to me July 6, 1886, and in which an implement is shown having peculiarly-arranged and adjustable disk-gangs carried by a wheeled frame.

My invention consists in the combination of parts hereinafter described, and pointed out in the claims.

Figure 1:
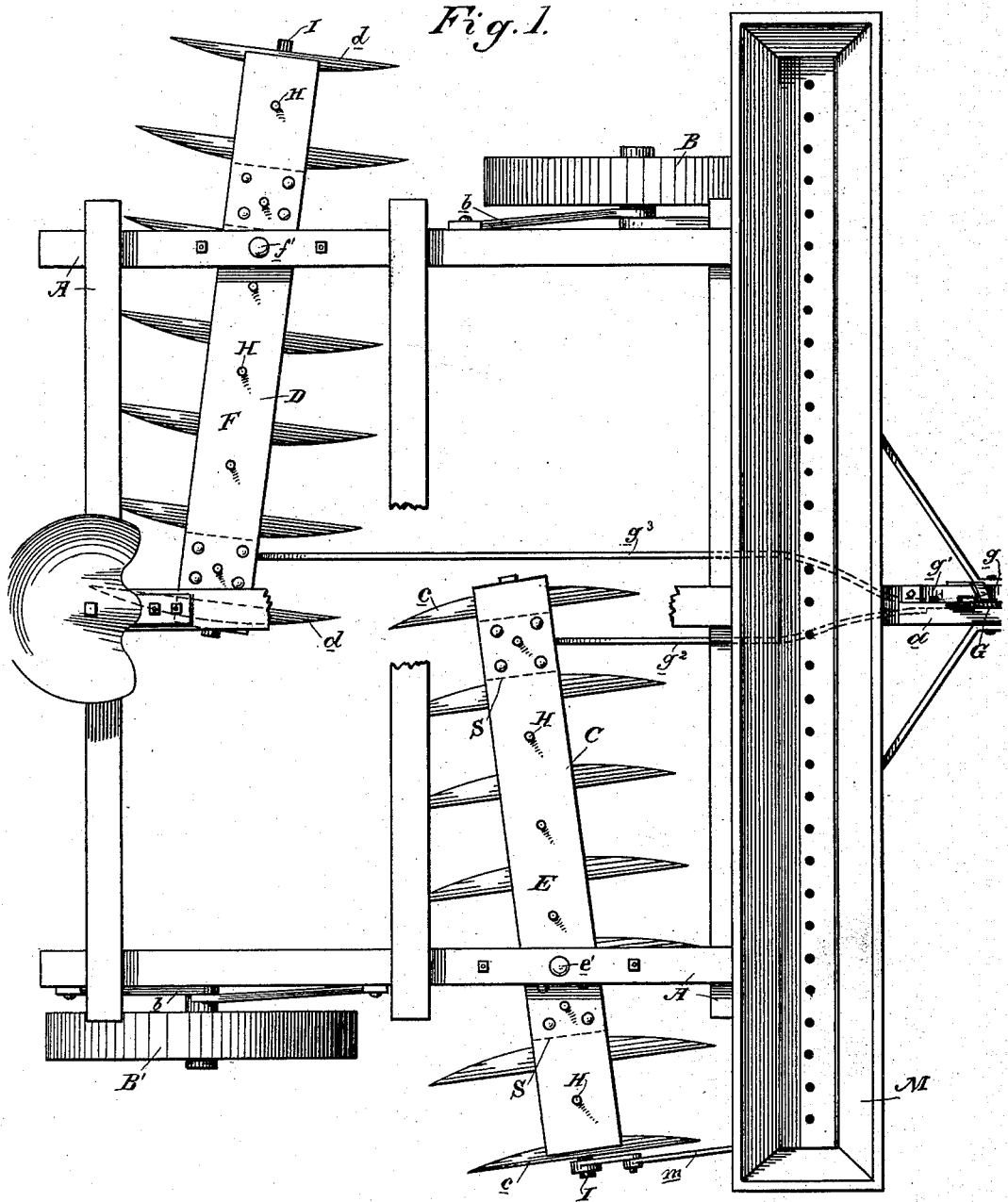
Figure 2:
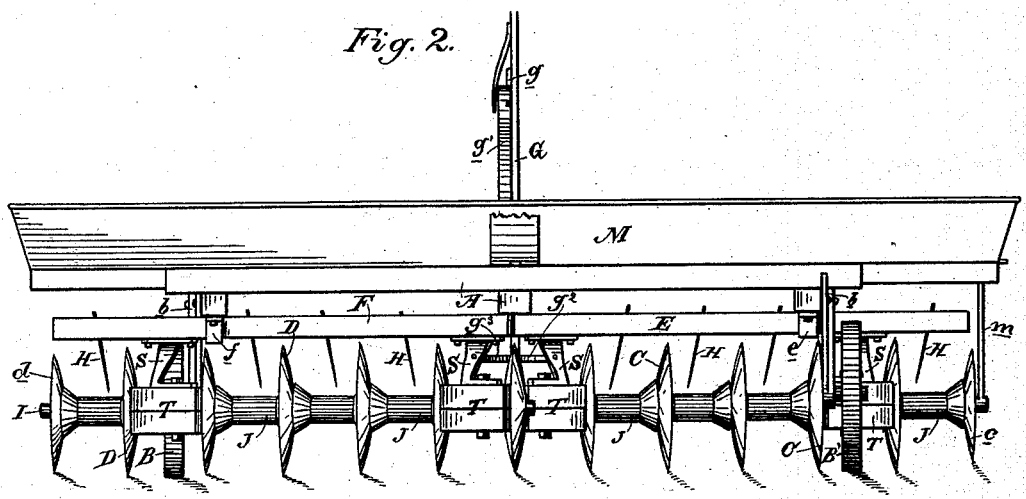
Figure 3:
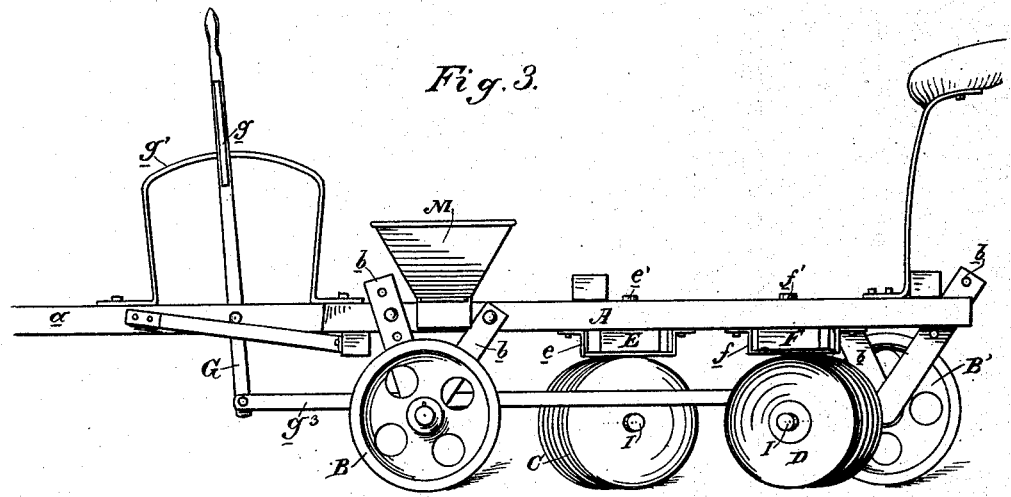
Figure 4:
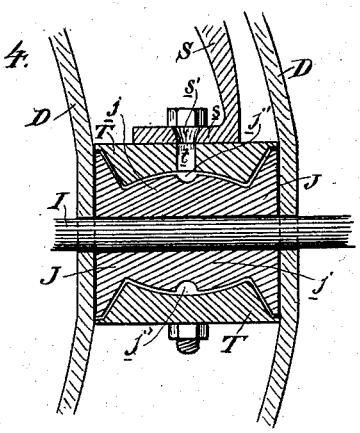

Referring to the accompanying drawings, Figure 1 is a plan of my cultivator and seeder. Fig. 2 is a rear elevation of same. Fig. 3 is a side elevation. Fig. 4 is a detail section of the journal-connection of the disk-gangs with the standards S.

The frame A of the machine consists of suitable longitudinal and transverse bars, to which is connected a tongue, $a$. The frame has a wheel, B, at one of its forward corners, and another wheel, B', at one of its rear corners, diagonally opposite, said wheels having standards $b$, with a series of holes, whereby they may be vertically adjusted when necessary.

C is the forward disk-gang located under the frame about opposite to the forward wheel, and D is the rear disk-gang located under the rear wheel, so that the frame about opposite to the rear wheel, so that the frame is carried at diagonally-opposite corners by the wheels and the disk-gangs. The advantage of this arrangement is that I need have but two wheels, and these, by their location, answer all the purposes of support and the regulation of the depth of work of the disks. The disk-gangs are connected with the frame as follows:

E is a bar passing under the outer bar of the frame and supported in a stirrup, $e$, bolted up under it. It is pivoted to said frame-bar by a pin or bolt, $e'$, but its inner end is entirely free. Bolted up under the bar E near each end is a standard, S, the lower end of which is bolted to a box, T, in which the journal of the disk-gang C is mounted.

F is the bar for the other disk-gang, D. It is supported under the outer frame-bar in a stirrup, $f$, and is pivoted thereto by a bolt or pin, $f'$, its inner end being free. Standards S depend from said bar to boxes T, in which the journal of the disk-gang D is mounted.

G is a lever pivoted in a slot in the tongue $a$ and having a pawl, $g$, engaging a rack, $g'$. The lower end of lever G is connected with the inner standard, S, of the forward disk-gang by a link, $g^2$, and with the inner standard of the rear disk-gang by a link, $g^3$. Now, by moving lever G the inclination of the disk-gangs is varied and adjusted to any suitable angle as their bars turn about their pivot-pins.

It is a feature of my machine that the innermost disks of each gang are in line, so that no strip of ground is left uncultivated, as is the case where the two gangs abut. The whole of the ground is therefore cut by the disks, and there is no need even for overlapping, as in my former patent.

I have found that by employing smaller and less concaved disks, as shown by $c\ d$, on the ends of the gangs ridging and furrowing of the land is prevented, but the whole is left evenly connected.

H are spikes or teeth which are passed down through the bars E F and extend a short distance down between the disks. These teeth act as cleaners, for, as they are stationary and the disks rotate, they cut out the dirt if it attempts to stick and fill up the space between the disks. The teeth also prevent weeds, &c., from rolling up around the shaft of the disks and thereby choking the machine.

The disks of each gang are all mounted on a shaft, I, and their places are preserved by the intervening spool-shaped bearings J, as in my previous patent; but in order to provide for a proper journal at the boxes T, where the standards S connect, I have the following construction:

That spool-shaped bearing J around which the two-part box T is fitted has an enlarged center, $j$, which is provided with an encircling groove, $j'$, and a hole, $t$, through the box communicates with said groove. The standard S has a foot, $s$, which is turned at right angles along and is secured to the box, and has a hole, $s'$, made in it communicating with hole $t$. As the disks are concavo-convex, the body of the standard is midway between the rims of the disks, so as not to interfere with them, while the hole in its bent foot s is midway between the centers of the disks and in proper alignment with the hole in the box T. Oil may therefore be readily poured through hole s', hole t, and into the groove of the journal-bearing, which serves as a chamber or receptacle to lubricate for a long time and very efficiently the whole journal.

M is the seed-box on the front of the frame, its interior mechanism, unnecessary herein to show or describe, being operated by means of connecting devices m from the front disk-gang.

Having thus described my invention, what I claim as new, and desire to secure by Letters Patent, is—

1. A disk cultivator and seeder consisting of the frame A, made of longitudinal and transverse bars, the carrying-wheels, one on each side and located at diagonally-opposite corners, the oppositely-inclined bars E F, pivoted to the sides of the frame, the lever and connections for varying and fixing the inclination of the bars, the shafts I, supported from standards carried by the inclined bars, and the disk-gangs carried by the shafts, said gangs having smaller and less concaved disks on each end, and the cleaning-spikes secured to and projecting downwardly from the inclined bars and between the disks, all arranged and adapted to operate substantially as described.

2. In a disk cultivator and seeder, the wheeled frame, the oppositely-inclined pivoted bars E F, and the shafts I, with their disk-gangs, having enlarged journals J, with an encircling groove, in combination with the connection between the gangs and the inclined bars, consisting of the standards S, bolted up under the bars and having a bent foot with an oil-hole, s', and the two-part boxes T, having an oil-hole connecting the oil-holes s' with the grooves of the journals J, said boxes encircling the journals J and bolted to the standard-feet, substantially as described.

In witness whereof I have hereunto set my hand this 9th day of January, A. D. 1888.

BASIL CLINTON DORSEY.

Witnesses:
EDWARD WARREN HOLLAND,
JAMES WILLIAM McDONALD.